Patented Dec. 17, 1940

2,224,865

UNITED STATES PATENT OFFICE 2,224,865

HYDROGENATED DI-NAPHTHYL ETHER RESINS AND THE PROCESS OF PREPARING THE SAME

Karl Folkers, Plainfield, N. J., assignor to Merck & Co. Inc., Rahway, N. J., a corporation of New Jersey No Drawing. Application October 16, 1937,
Serial No. 169,515

11 Claims. (Cl. 260—2)

This invention relates to hydrogenated dinaphthyl ether resins and the process of preparing the same.

Many naphthalene derivatives have been used in the preparation of resins, but little is known on the chemistry of hydrogenated dinaphthyl ethers. Crystalline di-ar.-tetrahydro-β-naphthyl ether has been prepared by hydrogenating di-β-naphthyl ether at 130–150° C., and about 20 atmospheres pressure, distilling the reaction product, and recovering the di-ar.-tetrahydro-β-naphthyl ether, which boiled at 242–244° C. at 8 mm. Upon recrystallization from methanol, microscopically small leaflets of the ether were obtained which melted at 58°. The crystalline ether had a fruit-like scent, and was suggested for use in perfumes, etc. (D. R. P. 545,195:1932; British Patent 326,762:1928). The process just described produces specifically the aryl-hydrogenated derivatives, and not the alicyclic hydrogenated derivatives. Other hydrogenated naphthyl ethers have not been prepared.

I have discovered that the ethers obtained by dehydration of hydrogenated naphthols are not crystalline compounds, as would be expected, but on the contrary, possess the characteristics of resins.

They are hard, solid, have no definite melting point, show no tendency to crystallize, and have the physical properties of luster and conchoidal fracture. They are soluble in the common solvents, such as benzene, chloroform, ethyl acetate, and the common ester lacquer solvents, alcohols, etc.

The chief difference of these ether resins from natural resins is that these are monomeric resins, and have a low molecular weight instead of the high molecular weight of true natural resins. This low molecular weight is a great advantage in that the ether resins have a greater solubility in solvents than the natural resins.

The stability of the ether linkage is a well known property, and these resins are not affected by contact with water, acids, alkalies, etc. They are valuable for use in protective coatings, or other varnishes, paints, cellulose lacquers, and in molding materials, impregnating solutions, etc.

Ac. or ar. hydrogenated alpha naphthol, ac. or ar. hydrogenated β naphthol, mixtures of ac. and ar. hydrogenated alpha or β naphthols, and their alkyl or aryl substituted products may be used as starting materials. The dehydration to an ether, of ac. hydrogenated β naphthol, which is a secondary alcohol and not a phenol as is β naphthol, is unexpected, as the dehydration of secondary alcohols ordinarily leads to formation of unsaturated compounds, with little or no ether formation.

Dehydration may be realized in several ways, for example in the presence of an acid condensing agent, such as hydrobromic acid, hydrochloric acid, sulfuric acid, etc., over salts, etc.

Dehydration proceeds slowly and with relatively small yield at ordinary temperatures, so it is preferably carried out at an elevated temperature, for example up to and including the refluxing temperature. If desired, dehydration may also be accomplished in an autoclave.

The following examples illustrate methods of carrying out the present invention, but it is understood that these examples are by way of illustration and not of limitation.

*Example I*

19 gm. of relatively pure ac.-tetrahydro-β-naphthol and 120 ml. of 40% hydrobromic acid solution are refluxed for four hours. The reaction mass is treated with benzene, and the benzene solution removed. The benzene is distilled and the residue vacuum distilled at 175–200° C. at about 2 mm. pressume. The distillate is non-crystalline and has other properties characteristic of resins. It is vitrious, has lustre, and conchoidal fracture at room temperature. It softens at 40–50° C. Elementary analysis shows carbon, hydrogen and oxygen in the proportions corresponding to the empirical formula $C_{20}H_{22}O$. It does not react with acetic anhydride to give an acetyl derivative. The structural formula appears to be

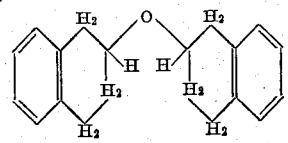

i. e. di-ac.-tetrahydro-β-naphthyl ether. The yield is 84%.

Upon redistillation at between 175–200° C. at 2 mm. the compound does not crystallize and retains its vitrious, resinous characteristics. It is transparent and almost colorless.

*Example II*

A mixture of 21 gm. of relatively pure ar.-tetrahydro-β-naphthol and 120 ml. of hydrobromic acid is refluxed for four hours and treated as in Example I. A resinous ether is obtained having physical properties similar to those of the resinous product of Example I. The yield of di-ar.-tetrahydro-β-naphthyl ether is 29.3%.

Example III

A mixture of 15 g. of highly purified ac.-tetrahydro-β-naphthol and 80 ml. of 40% hydrobromic acid was stirred and boiled under reflux for 4.5 hours. With the aid of benzene as a solvent, there was obtained 12.5 g. (83.4%) of resinous di-ac.-tetrahydro-β-naphthyl ether, which boiled at 214–217° at 2 mm.

Example IV

A mixture of 15 g. of highly purified ar.-tetrahydro-β-naphthol and 80 ml. of 40% hydrobromic acid was stirred and boiled under reflux for 4.5 hours. With the aid of benzene as a solvent, there was obtained 2.2 g. (14.7%) of sticky, resinous di-ar.-tetrahydro-β-naphthyl ether, which resembled the solid resinous ethers when they had been warmed to their softening temperature.

Example V 10 g. of pure ac.-tetrahydro-β-naphthol, and 10 g. of pure ar.-tetrahydro-β-naphthol, and 120 ml. of 40% hydrobromic acid were stirred and boiled under reflux for 10 hours. With the aid of benzene as solvent, etc., there was obtained an 85% yield of mixed ethers which boiled at 210–214° C. at 2 mm. The properties of the mixed ethers were definitely resinous. Softening began at 45°.

Example VI 20 g. of the mixed tetralols obtained from catalytic hydrogenation and 120 ml. of 40% hydrobromic acid were refluxed for four hours. With the aid of benzene as solvent, etc., there was obtained on vacuum distillation, a 58.5% yield of mixed ethers. The ethers were solid, brittle, resinous, etc.

Example VII

The process of Example VI was carried out using 100 g. of 50% sulfuric acid as the dehydrating agent. A 25% yield of mixed resinous ethers were obtained, having properties similar to the resinous ethers of Example VI.

Example VIII

The process of Example VI was carried out using 120 ml. of 36% hydrochloric acid. A 27.7% yield of mixed resinous ethers were obtained, having properties similar to the resinous ethers of Example VI.

Example IX 128 g. of mixed tetralols obtained from catalytic hydrogenation and 700 ml. of 20% hydrochloric acid were stirred and boiled under reflux for thirteen hours. The yield of mixed resinous ethers was 42%.

Example X 28 g. of mixed alpha tetralols obtained by catalytic hydrogenation and 120 ml. of 40% hydrobromic acid were stirred and boiled under reflux for four hours. After cooling, the semi-solid mass was removed mechanically, and with the aid of acetone as solvent, it was distilled in vacuo. The yield of mixed alpha ethers was 18.9 g. or 81%, which distilled at 190–212° C. at 2 mm. The properties of these mixed alpha ethers were similar to the resinous properties of the mixed beta ethers.

Modifications may be made in carrying out the invention without departing from the spirit and scope thereof, and I am not to be limited to any specific details of the above examples, nor to any degree of hydrogenation of the naphthols, but only by the appended claims.

I claim:

1. A hydrogenated-di-naphthyl resinous ether.
2. Di-tetrahydro-β-naphthyl resinous ether.
3. Ac-hydrogenated - di - β - naphthyl resinous ether.
4. Di - ac - tetra - hydro - β - naphthyl resinous ether.
5. Ar-hydrogenated - di - β - naphthyl resinous ether.
6. Di-ar-tetrahydro-β-naphthyl resinous ether.
7. A hydrogenated alpha - naphthyl resinous ether.
8. Di - tetrahydro - alpha - naphthyl resinous ether.
9. The process comprising dehydrating a hydrogenated naphthol in the presence of an inorganic acid dehydration catalyst to a hydrogenated di-naphthyl ether resin.
10. The process comprising dehydrating a hydrogenated β-naphthol in the presence of an inorganic acid dehydration catalyst to a hydrogenated di-β-naphthyl ether resin.
11. The process comprising dehydrating a hydrogenated alpha-naphthol in the presence of an inorganic acid dehydration catalyst to a hydrogenated di-alpha-naphthyl ether resin.

KARL FOLKERS.